(12) United States Patent
Krause et al.

(10) Patent No.: US 7,798,751 B2
(45) Date of Patent: Sep. 21, 2010

(54) PNEUMATIC DRILL

(75) Inventors: Gus E. Krause, Arlington, TX (US);
William B. Maurer, Houston, TX (US);
Glenn G. Born, Fort Worth, TX (US)

(73) Assignee: Lockheed Martin Corporation, Bethesda, MD (US)

( * ) Notice: Subject to any disclaimer, the term of this patent is extended or adjusted under 35 U.S.C. 154(b) by 204 days.

(21) Appl. No.: 11/986,276

(22) Filed: Nov. 20, 2007

(65) Prior Publication Data
US 2008/0075544 A1 Mar. 27, 2008

Related U.S. Application Data

(62) Division of application No. 10/659,410, filed on Sep. 10, 2003, now Pat. No. 7,303,363.

(51) Int. Cl.
*B23B 47/22* (2006.01)
*B23B 47/24* (2006.01)
(52) U.S. Cl. .............. 408/130; 408/5; 408/6; 408/17
(58) Field of Classification Search ........... 408/5, 408/6, 8, 10, 11, 17, 130
See application file for complete search history.

(56) References Cited

U.S. PATENT DOCUMENTS 1,999,248 A 4/1935 Melling (Continued)

FOREIGN PATENT DOCUMENTS

FR 933418 4/1948

(Continued)

OTHER PUBLICATIONS

U.S. Appl. No. 10/445,518, filed May 27, 2003, Born.

(Continued)

*Primary Examiner*—Boyer D Ashley
*Assistant Examiner*—Sara Addisu
(74) *Attorney, Agent, or Firm*—Bracewell & Giuliani LLP (57) ABSTRACT

A drill has a tubular outer housing and a tubular inner housing. The inner housing is movable between extended and retracted positions. A pneumatic motor with a chuck mounts to the inner housing. Air pressure is delivered to annular pistons to cause the inner housing to extend and retract. Also, an annular hydraulic chamber with a variable orifice bypass controls the rate of feed. A processor records the total number of holes being drilled as well as recording the time duration for each hole.

4 Claims, 5 Drawing Sheets

U.S. PATENT DOCUMENTS

| | | |
|---|---|---|
| 2,406,482 A | 8/1946 | Tucker |
| 2,657,595 A | 11/1953 | Shaff |
| 2,860,531 A * | 11/1958 | De Groff .................... 408/130 |
| 2,882,762 A | 4/1959 | Stratman et al. |
| 4,025,218 A | 5/1977 | Logan et al. |
| 4,440,529 A * | 4/1984 | Henslee et al. ............. 408/1 R |
| 4,557,338 A | 12/1985 | Baatrup |
| 5,149,232 A * | 9/1992 | Eckman ...................... 408/137 |
| 5,295,770 A | 3/1994 | Pennison et al. |
| 5,937,970 A * | 8/1999 | Wates ........................ 184/55.2 |
| 6,099,213 A | 8/2000 | Kammeraad et al. |
| 6,761,513 B2 * | 7/2004 | Born ........................... 408/97 |
| 6,788,997 B1 * | 9/2004 | Frederick ................... 700/236 |
| 2004/0101376 A1 * | 5/2004 | Shemeta .................... 408/130 |

FOREIGN PATENT DOCUMENTS

| | | |
|---|---|---|
| FR | 2779370 | 12/1999 |
| GB | 137757 | 1/1920 |
| SU | 683858 A * | 9/1979 |

OTHER PUBLICATIONS

Cooper Power Tools *Buckeye, Doler & Gardner-Denver Equipment*, p. 9.

Deschner Corporation of Santa Ana, California—Kinechecks *Constant Speed/Feed Control*, 9 pages.

* cited by examiner

PNEUMATIC DRILL

RELATED APPLICATIONS

This application is a divisional of application Ser. No. 10/659,410, filed Sep. 10, 2003 now U.S. Pat. No. 7,303,363.

FIELD OF THE INVENTION

This invention relates in general to drills, and particularly to a self-feeding pneumatic drill motor assembly for drilling holes in workpieces.

DESCRIPTION OF THE PRIOR ART

Certain manufacturing operations, such as aircraft manufacturing, require a high level of precision in drilling holes. Typically, a guide template having attachment points for connection to the front of a drill motor is attached to the workpiece to be drilled. The drill motor has a feed mechanism for advancing the drill bit into the material while the drill stays attached to the template.

One type of prior art feed mechanism comprises a mechanical feed utilizing a threaded collar or other mechanical arrangement for feeding the drill bit into the material at a given rate. The feed rate is adjustable, however the force between the bit and the material is usually not monitored or adjusted. As the cutting edge on the drill bit dulls, the bit generates a greater amount of thrust as it is fed through the workpiece. If the feed rate is not adjusted to compensate for the drill bit wear, more force is induced into the workpiece. This force can cause misalignment of the hole and also unevenness as the bit breaks through the back side of the hole. It is difficult to determine when a drill bit has become too dull to continue drilling.

Air cylinders have also been utilized for feed mechanisms. An air pressure system is more compliant than a positive mechanical feed system. Typically one or more air cylinders are parallel to and offset from the axis of rotation of the drill motor. The speed of the advancement is typically controlled by a restrictor unit. The restrictor unit includes a cylinder containing hydraulic fluid. A piston acts against the fluid, and a bypass passage allows the fluid to flow around the piston. The bypass passage has an adjustable orifice to control the rate of speed.

The air cylinder and speed control cylinder develop moment arms between the drill motor axis and the frame holding the drill motor. The moments tend to bend the frame, causing the drill motor and drill bit to move out of alignment, producing an unsatisfactory hole.

SUMMARY OF THE INVENTION

The drilling assembly of this invention has a tubular outer housing with a bore. An inner housing is mounted in the bore for reciprocal axial movement. A pneumatic motor assembly with a chuck that receives a drill bit is carried in the inner housing for movement with it. An annular pneumatic chamber is located between the inner housing and the outer housing for supplying feed pressure to move the inner housing between retracted and extended positions.

Additionally, an annular fluid restrictor chamber is located between the inner and outer housings. The restrictor chamber contains hydraulic fluid for controlling a rate of axial movement of the inner housing relative to the outer housing. An annular piston mounted to the inner housing moves against the hydraulic fluid in the restrictor chamber. A bypass passage extends from one side of the annular piston to the other to allow flow. A variable orifice is located in the bypass passage.

A sensor mechanism determines when the inner housing begins to move from the retracted position. The sensor mechanism also provides a signal when the inner housing reaches the extended position. A processor receives these signals and computes the elapsed time between the signals. The processor compares the elapsed time to a reference signal. If the time is in excess of the reference signal, a warning indication will be provided to the operator, indicating a dull drill bit or some other problem. The processor also displays a cumulative count of holes drilled by a particular drill bit. The cumulative count informs the operator when a drill bit is due for changing.

In the preferred embodiment, the sensor mechanism comprises a pair of dome members. Each dome member is a thin concave metallic disc. Each dome member is positioned in a cavity in a valve block. The pneumatic controls provide an air pulse when the motor begins to move from the retracted position, and this air pulse is communicated to one of the domes. Similarly, an air pulse is provided when the full stroke is reached, and that pulse is delivered to the other dome. When the air pulses strike the domes, the domes deflect into engagement with a conductor that provides a signal to the processor. Preferably the conductor is located in a circuit board that is mounted in abutment to the valve block.

The pneumatic controls are designed so that the motor is powered independently of the feed mechanism. Air pressure is supplied to the feed mechanism to causes it to advance only when the operator momentarily opens a normally closed feed valve. The feed valve in the preferred embodiment delivers a pilot pulse to a shuttle valve, causing it to move to a feed position where air pressure flows to the feed chamber.

The pneumatic controls also include a retract valve that is manually contacted by a striker plate carried with the inner housing for movement therewith. The striker plate contacts the retract valve at the conclusion of the stroke. The retract valve then sends a pulse of air pressure to the shuttle valve to cause it to move back to a closed position. In the closed position, air pressure is bled from the feed cylinder. The striker plate is adjustable to vary the stroke length.

DETAILED DESCRIPTION OF THE INVENTION

Figure 1:
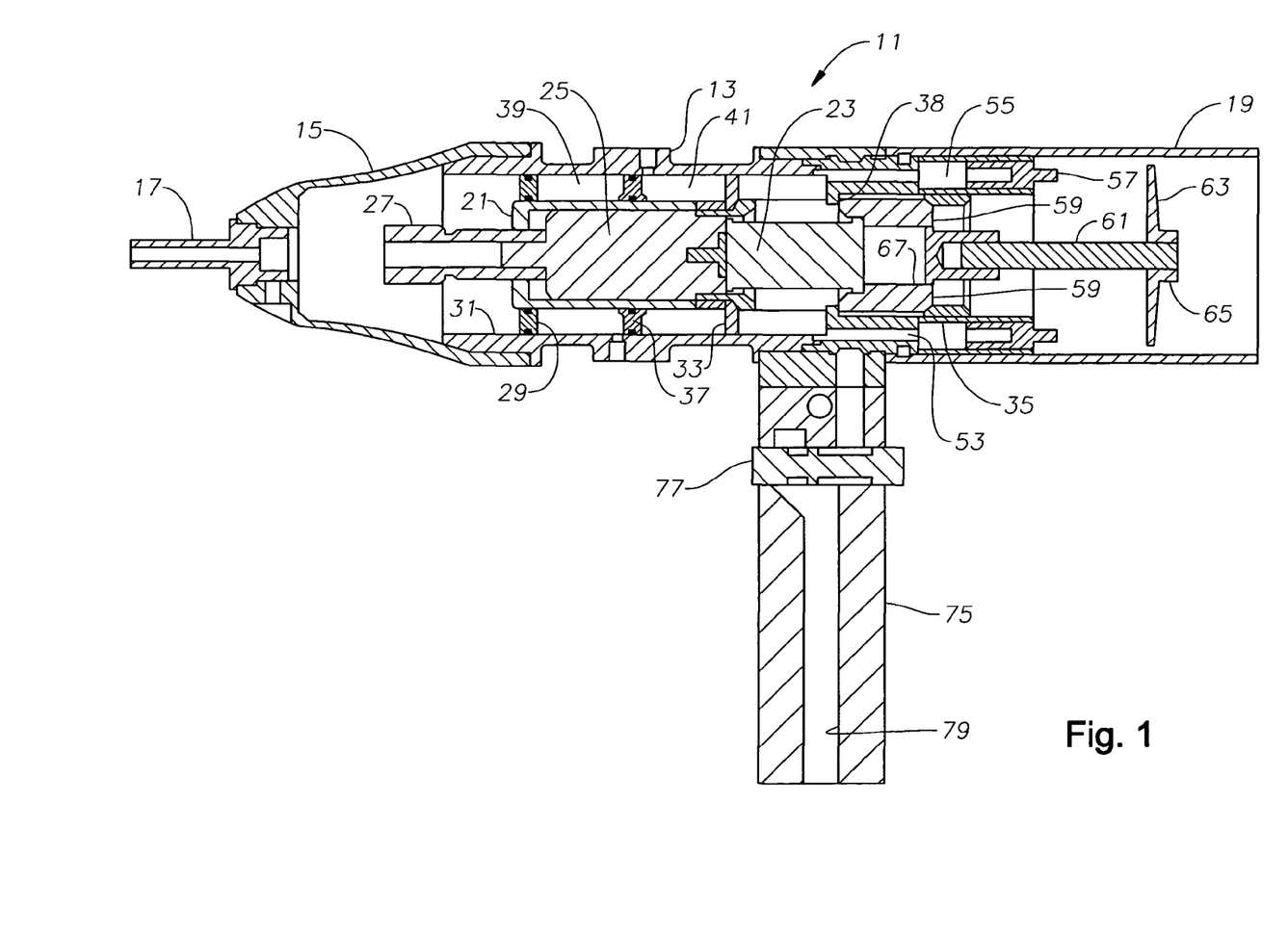
FIG. 1 is sectional view, partially schematic, of a drill constructed in accordance with this invention.

Referring to FIG. 1, drill 11 has a tubular outer housing 13. A nosepiece 15 attaches to the forward end of outer housing 13. A guide 17 extends from the forward end of nosepiece 15. An end protector 19 that is generally cylindrical secures to the rearward end of outer housing 13.

A tubular inner housing 21 is mounted in outer housing 13 for reciprocal movement along the axis of outer housing 13. Inner housing 21 moves between the retracted position shown in FIG. 2 and the extended position shown in FIG. 4. In this embodiment, inner housing 21 is formed in two separate components, a forward portion and a rearward portion. The forward and rearward portions are secured together by threads 22.

A conventional pneumatic motor 23 is mounted within the rearward portion of inner housing 21 for axial movement with inner housing 21. Motor 23 is of a vane type that rotates eccentrically within a cylinder at high speed in response to air pressure. Motor 23 is connected to a gear box 25 that drives a chuck 27 at a reduced speed but greater torque than motor 23. Chuck 27 is mounted to the forward end of gear box 25 for receiving a drill bit (not shown). When inner housing 21 strokes forward, the drill bit will extend through guide 17 to drill a workpiece. A guide rod (not shown) protrudes from a rear end of inner housing 21 and slidingly engages a bushing attached to outer housing 13 to transfer torque generated by motor 23 to outer housing 13.

The outer diameter of inner housing 21 has smaller diameter portions than the inner diameter of outer housing bore 31, creating annular chambers between them that are concentric with the longitudinal axis of bore 31. A forward piston or seal 29 is mounted to the forward end of inner housing 21 for movement with inner housing 21. Forward piston 29 sealingly engages bore 31. An intermediate or feed piston 33 is formed as a flange with a seal on the rear end of the forward portion of inner housing 21 approximately at threads 22. Alternately, intermediate piston 33 could be a separate member that is mounted for movement with inner housing 21. The seal of intermediate piston 33 sealingly engages bore 31. A rearward or retract piston 35 is integrally formed on the rearward end of the rearward portion of inner housing 21. Rearward piston 35 includes a seal that sealingly engages a reduced diameter portion of bore 31. The pressure area of rearward piston 35 is less than the pressure areas of intermediate and forward pistons 33, 29.

A forward stationary seal 37 is mounted stationarily to bore 31 for sealingly engaging the outer diameter of inner housing 21. Forward stationary seal 37 is located between forward and intermediate pistons 29, 33 and has the same pressure area. A rearward stationary seal 38 is stationarily secured to bore 31 for sealingly engaging another part of the outer diameter of inner housing 21. Rearward stationary seal 38 is located between intermediate piston 33 and rearward piston 35. The pressure area of rearward stationary seal 38 is the same as rearward piston 35.

Forward piston 29 and forward stationary seal 37 define a forward restrictor chamber 39. Similarly, a rearward restrictor chamber 41 locates between forward stationary seal 37 and intermediate piston 33. The volume of each restrictor chamber 39, 41 varies depending up the particular position of pistons 29, 33. However, the sum of the volumes of chambers 39, 41 remains constant. Restrictor chambers 39, 41 contain a hydraulic fluid to serve as a fluid restrictor to control the speed of forward movement of inner housing 21.

Figure 2:
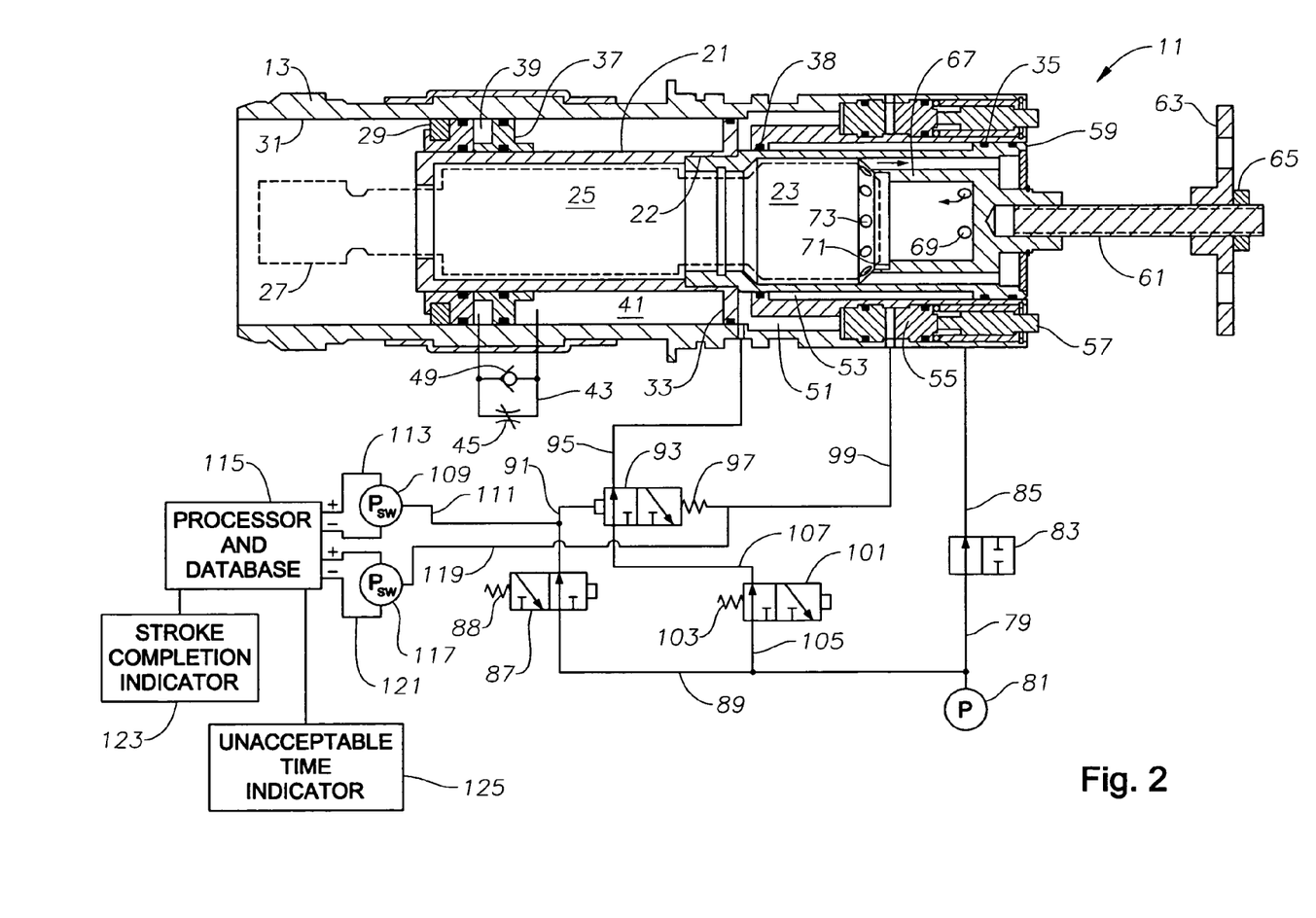
FIG. 2 is an enlarged sectional view of a portion of the drill of FIG. 1, shown in a retracted position and also schematically illustrating the pneumatic controls and electronic components.

Referring to FIG. 2, a bypass passage 43 extends between forward and rearward restrictor chambers 39, 41. Bypass passage 43 enters forward chamber 39 immediately forward of forward stationary seal 37 and enters rearward chamber 39 immediately rearward of stationary seal 37. A variable orifice 45 is contained in bypass passage 43. Variable orifice 45 is typically a needle valve. Also, a return stroke passage 47 extends in parallel with bypass passage 43. A check valve 49 allows flow from forward restrictor chamber 39 to rearward restrictor chamber 41 through return stroke passage 47, but does not allow the reverse. The adjustment of orifice 45 determines the rate at which hydraulic fluid can flow through bypass conduit 43 during the forward or feed stroke and thus determines the speed at which the stroke occurs.

A pneumatic feed chamber 51 comprises the annular area between inner and outer housings 21, 13 between rearward stationary seal 38 and intermediate piston 33. Intermediate piston 33 thus contacts hydraulic fluid on its forward side within rearward restrictor chamber 41 and air pressure on its rearward side within feed chamber 51.

A separate return chamber 53 is located between the outer diameter of inner housing 21 and a reduced diameter portion of bore 31 of outer housing 13. Return chamber 53 is defined on its rearward end by rearward piston 35 and on its forward end by rearward stationary seal 38. Return chamber 53 also is a pneumatic chamber that receives air pressure. Feed chamber 41 and return chamber 53 serve as an air cylinder to move inner housing 21 between retracted and extended positions.

Two retract valves 55 are mounted at the rearward end of outer housing 13 in communication with feed chamber 51. Each retract valve 55 is 180° apart from the other. Each retract valve 55 has an actuator or plunger 57 that protrudes past the rearward end of outer housing 13. When depressed, plungers 57 cause retract valves 55 to open to release some of the air pressure from feed chamber 51. Retract valves 55 control the depth of the stroke, and although two are shown, one is redundant and the other could optionally be deleted.

Figure 4:
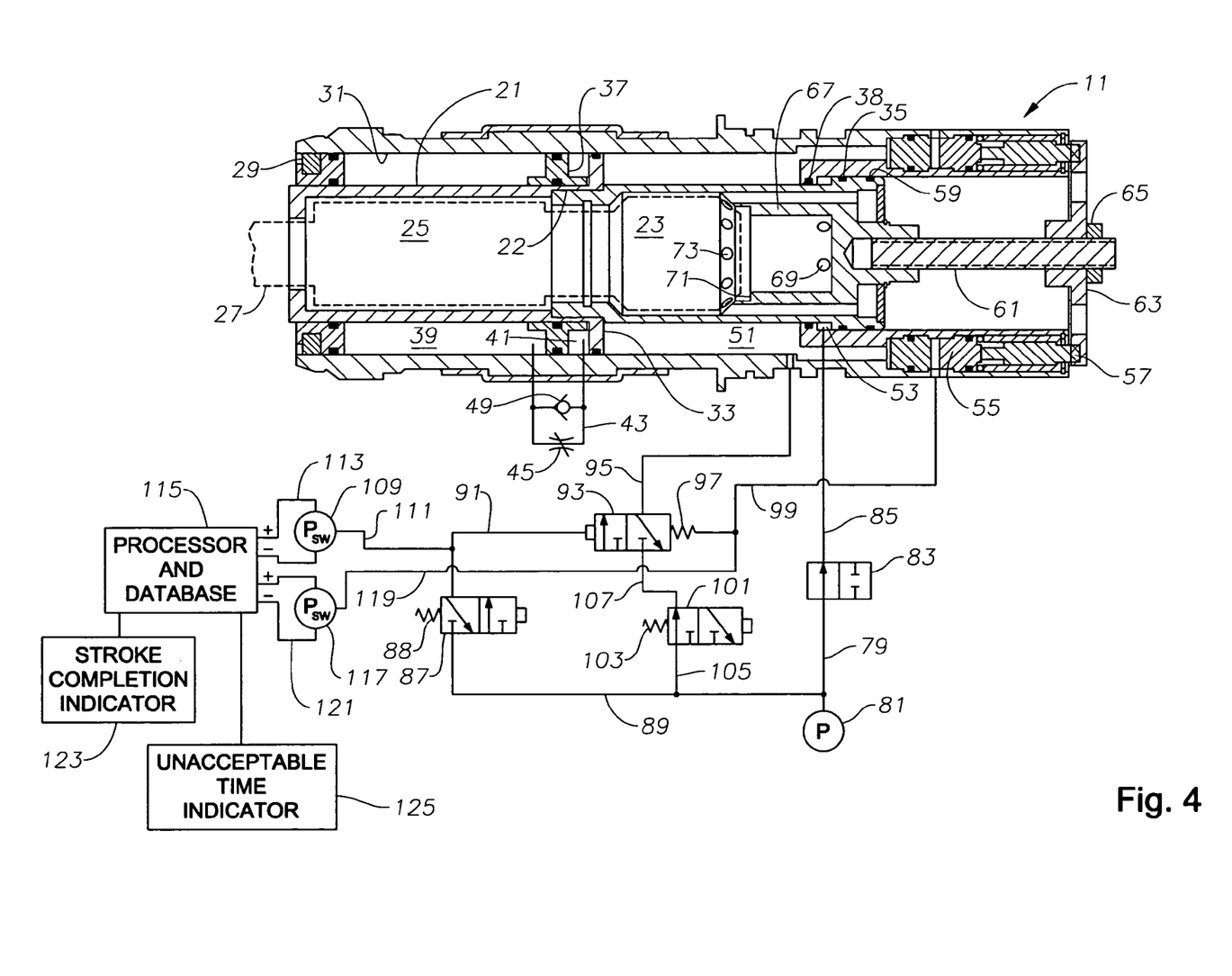
FIG. 4 is a sectional view of the drill of FIG. 1, shown similar to FIG. 3, but in the extended position.

The rearward end 59 of the rearward portion of inner housing 21 has a receptacle for receiving a threaded rod 61, which extends axially from end 59 for movement with inner housing 21. A striker plate 63 is adjustably secured to threaded rod 61. A nut 65 allows striker plate 63 to be adjusted to various points along the length of threaded rod 61. Striker plate 63 contacts plungers 57 and opens valves 55 when it reaches the full depth of the stroke as illustrated in FIG. 4.

A motor manifold 67 is located within inner housing 21 on the rearward side of motor 23. Motor manifold is preferably an integral portion of the rearward portion of inner housing 21 Motor manifold 67 is a cylindrical member having inlet holes 69 to allow the delivery of air pressure to motor 23. Motor 23 has a rearward end that fits sealingly in a counterbore 71 in motor manifold 67 to receive air pressure from inlet holes 69. A plurality of exhaust holes 73 surround counterbore 71 to receive the exhaust air from motor 23. Exhaust holes 73 extend to rearward end 59 to allow exhaust air flow through rearward end 59 to atmosphere.

Referring again to FIG. 1, drill 11 preferably has a grip 75 for gripping by a user. Grip 75 also contains a valve assembly 77 for controlling the operation of drill 11. An air inlet 79 extends into grip 75 for delivering air pressure.

Referring again to FIG. 2, a compressed air source 81 delivers air pressure to a motor valve 83 that is mounted on grip 75. Motor valve 83 opens and closes a motor valve passage 85 that leads to air inlets 69 and also to return chamber 53. Consequently, when motor valve 83 is on, air pressure will be supplied to motor 23 to cause it to rotate. Air pressure is also supplied to return chamber 53 at the same time. This air pressure in return chamber 53 acts between rearward stationary seal 38 and rearward piston 35, tending to urge inner housing 21 to the retracted position shown in FIG. 2.

Air pressure from air source 81 is supplied continually to a feed valve 87 via a feed valve passage 89. In this embodiment, feed valve 87 is supplied with air pressure whether or not motor valve 83 is in the on or off position. Alternately, motor valve 83 could be located between air source 81 and feed valve 87 for controlling air flow to feed valve 87. Feed valve 87 is a normally closed valve that is biased to the closed position by a spring 88. In FIG. 2, feed valve 87 is shown in the open position, which occurs only when an operator manually depresses it. Once the operator removes manual pressure, feed valve 87 will be moved by spring 88 back to the closed position. In the open position, feed valve 87 passes air pressure from air source 81 to a pilot passage 91 that leads to a shuttle valve 93. In the closed position, air pressure is blocked by feed valve 87, and pilot passage 91 exhausts to atmosphere through feed valve 87.

Shuttle valve 93 has two positions and is shifted between positions by pilot pulses. Shuttle valve 93 has an output passage 95 that leads to feed chamber 51 for supplying air pressure to feed chamber 51. A spring 97 acts against one side of shuttle valve 93, urging it to a closed position, shown in FIG. 4, when pressure in feed chamber 51 is bled out. Spring 97 does not have sufficient force to move shuttle valve 93 to the closed position while shuttle valve 93 is supplying air through its output passage 95 to feed chamber 51.

An output pulse delivered from a second pilot passage 99 will cause shuttle valve 93 to change from the feed to the closed or retract position. Pilot passage 99 leads from retract valves 55. Each retract valve 55 has one end exposed to air pressure within feed chamber 51. When plungers 57 are depressed, valves 55 allow air pressure from feed chamber 51 to flow through pilot passage 99 to shuttle valve 93 to cause it to move to the position of FIG. 4.

This embodiment preferably has an emergency valve 101 that is in a normally open position as shown in the drawings. A spring 103 urges emergency valve 101 toward the closed position. Manual engagement by an operator will move it to an open position. Emergency valve 101 has an inlet passage 105 that extends from passage 89 for supplying air pressure to emergency valve 101. Emergency valve 101 has an outlet passage 107 that leads to shuttle valve 93 in this embodiment. Consequently, when shuttle valve 93 is supplying air pressure to feed chamber 51, the air pressure will be flowing from passage 105 through emergency valve 101 and passage 107 to shuttle valve output passage 95. Manually depressing emergency valve 101 will cause the pressure in feed chamber 51 and passages 95, 107 to exhaust to atmosphere, and at that point, spring 97 will push shuttle valve 93 back to the position shown in FIG. 4. Shuttle valve 93 will remain in the closed position until receiving a pilot pulse from feed valve 87, which occurs only when the operator again manually depresses feed valve 87.

In this embodiment, a system is preferably employed to determine if the drill bit is becoming dull. The system includes a start feed pressure switch 109 that is connected by a passage 111 to pilot passage 91 of feed valve 87. Pressure switch 109 is connected by conductors 113 to an electronic processor and database 115. One of the conductors 113 will be positive and the other negative. When start feed pressure switch 109 indicates receipt of a pressure pulse in passage 111, it momentarily changes its state to either complete or break a circuit through conductors 113. Processor 115 notes the change in state, which indicates the occurrence of a pilot pressure pulse in pilot passage 91 of feed valve 87.

Similarly, a stop feed pressure switch 117 is connected by a passage 119 to pilot passage 99. Pressure switch 117 is connected by conductors 121 to processor 115. Upon receipt of a pilot pressure pulse from passage 119, stop feed pressure switch 117 changes its state momentarily, which is noted by processor 115.

Processor 115 will count each pilot pressure pulse received by pressure switches 109 and 117 to determine how many holes a particular drill bit has drilled a hole. The cumulative total number of strokes is recorded in its database. Processor 115 preferably has a display that displays the total count to the operator, informing the operator when it is time to change the drill bit. Also, the total count of strokes can be compared to a reference total number to provide a warning when the number of strokes reaches that reference number, indicating that it is time to change the drill bit.

In addition, processor 115 has a timer that times the duration between receipt of a pilot pulse by pressure switch 109 and receipt of a pilot pulse by pressure switch 117. The elapsed time is the total amount of time that it takes to drill through the workpiece to the full stroke. Processor 115 may display this elapsed time. Processor 115 preferably has a predetermined reference time in its database for the particular type of hole being drilled. The reference time represents the maximum time that it should take to drill the particular hole with a reasonably sharp drill bit. The reference time will be determined experimentally and will depend on the type of material, the feed rate, and the depth of the hole. Typically the database in processor 115 will contain a number of reference times for different holes to be drilled, and a technician will select the particular reference prior to drilling the hole. Processor 115 compares the actual elapsed time to the reference time and provides a signal to the operator. If the elapsed time equals or is less than the reference time, an indicator 123, such as an LED, will light. If the elapsed time exceeds the reference time, an indicator 125, such as an LED, will light. Other types of indications or displays are feasible.

Figure 3:
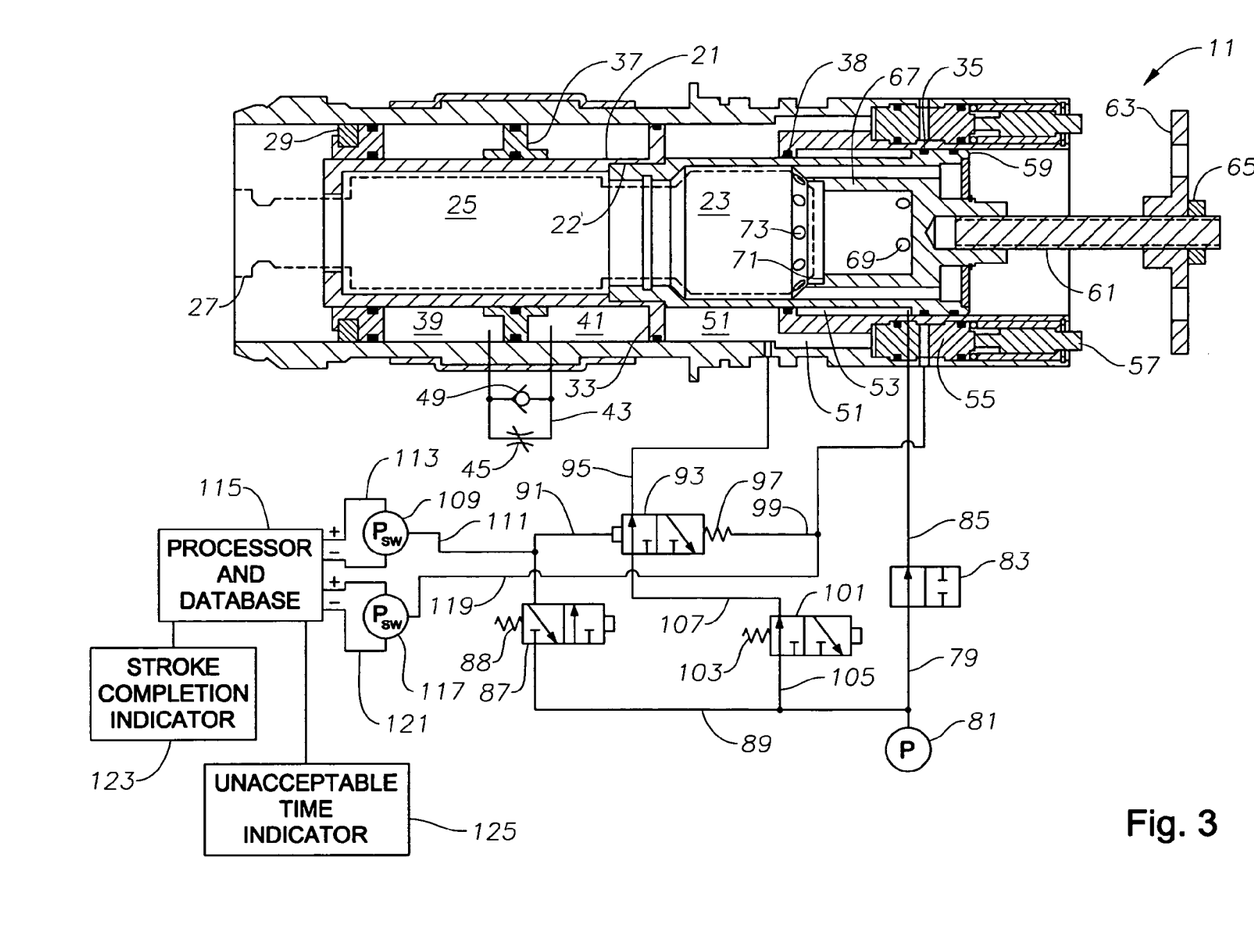
FIG. 3 is a sectional view of the drill of FIG. 1, shown similar to FIG. 2, but in a mid-stroke position moving toward an extended position.
Figure 5:
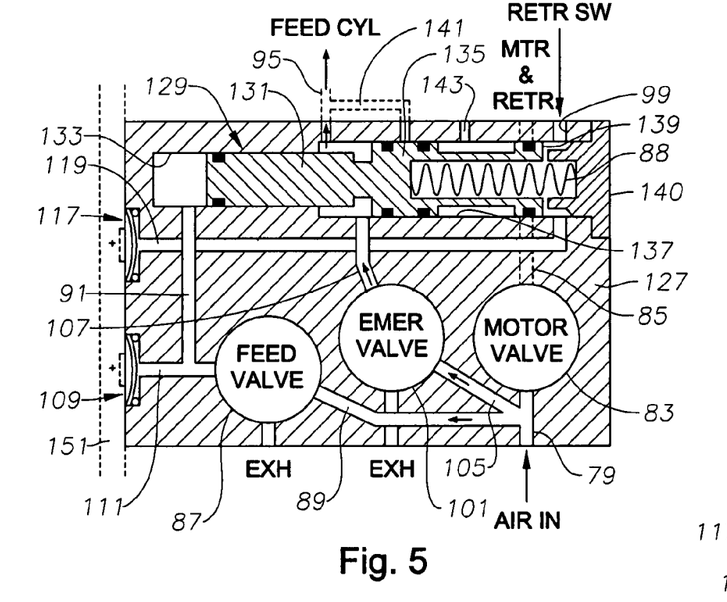
FIG. 5 is a sectional partially schematic view of a valve assembly for the drill of FIG. 1, showing a shuttle valve in a feed position.
Figure 6:
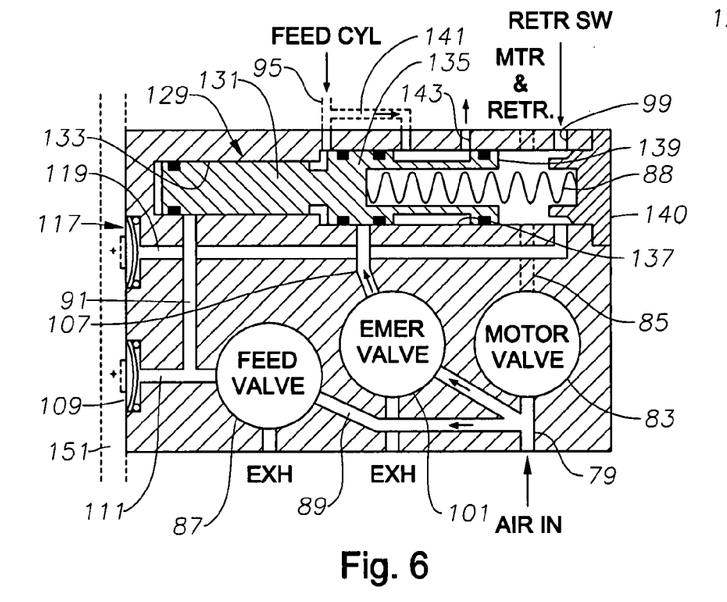
FIG. 6 is a view of the valve assembly of FIG. 5, but showing the shuttle valve in a closed position.

FIGS. 5 and 6 disclose the pneumatic circuitry of valve assembly 77 (FIG. 1) more graphically than in FIGS. 2-4. A valve block 127 is mounted to or forms a part of grip 75 (FIG. 1). Valve block 127 has passages within it that correspond to the various air flow passages shown in FIGS. 2-4. Preferably motor valve 83, emergency valve 101, feed valve 87 and shuttle valve 93 are mounted to and within portions of valve block 127. The passages in valve block 127 communicate directly with passages outer housing 13, avoid external air passages or tubes between valve block 127 and inner and outer housings 21, 13.

Shuttle valve 93 in this embodiment comprises a spool 129 that moves axially between the open or feed position shown in FIG. 5 and the closed or retract position shown in FIG. 6. Spool 129 has a forward seal or piston 131 that is slidingly carried within a chamber 133. Spool 129 has a larger diameter intermediate piston 135 that is sealingly and slidingly carried within a chamber 137. Two seals are located on intermediate piston 135. An end seal or piston 139 is located at the rearward end of spool 129. A cap or plug 140 is located at the rearward end of chamber 137.

An exhaust passage 141 joins shuttle valve output passage 95 and leads back to larger diameter chamber 137. While in the open position shown in FIG. 5, exhaust passage 141 is blocked from communication with chamber 137 because it locates between the two seals of intermediate piston 135. However, when spool 129 moves to the closed position of FIG. 6, exhaust passage 141 communicates with chamber 137 rearward of intermediate piston 135. An exhaust port 143 leads from chamber 137 to atmosphere, exhaust port 143 being spaced between rearward piston 139 and intermediate piston 135 in both positions.

Figure 7:
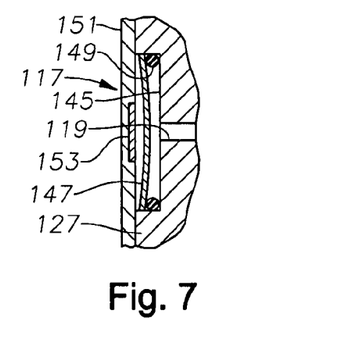
FIG. 7 is an enlarged view of one of the dome members shown in the valve assembly of FIGS. 5 and 6.

In this embodiment, pressure switch 117 comprises a tactile dome 147, as shown in FIG. 7. Tactile dome 147 is a thin member of conductive metal that is slightly dome-shaped. For example, the thickness of dome 147 may be about 0.010" and the diameter about 0.350". The concavity may be approximately 0.017" from its center point to a flat plane joining its edges. Tactile dome 147 is of a type that is typically used in a keypad such as on a mobile telephone for completing a circuit when manually depressed.

In this embodiment, tactile dome 147 is positioned and sealed within a cavity 145 to deflect when it receives a pressure pulse. A seal 149, such as an O-ring, seals the periphery of tactile dome 147, however the circumference of dome 147 is in electrical engagement with the conductive metal of valve block 127. Preferably a portion of a circuit board 151 is placed in flush abutment with one side of valve block 127. Circuit board 151 is part of processor 115 and has conductive traces or contacts 153 positioned along the center of each dome 147 for physical contact by dome 147 when deflected. Typically, contact 153 will be at a voltage potential. When dome 147 deflects to a planar condition, it completes a circuit from contact 153 through the outer edges of dome 147 to valve block 127, which serves as a ground. It is feasible to mount contacts 153 adjacent domes 147 in manners other than by a circuit board 151.

In operation, a technician inserts a drill bit into chuck 27, adjusts striker plate 63 to the desired stroke depth, and adjusts variable orifice 45 to the desired feed rate. The technician zeroes the cumulative total in processor 115 (FIG. 2) and inputs or selects the standard reference time for drilling the hole in the particular workpiece.

The operator will pick up drill 11 and insert and lock guide 17 in the template. The operator turns on motor valve 83 to supply air to motor 23. As shown in FIG. 2, the air flows through passage 85 and air inlet 69 into motor 23. This causes the drill bit to begin rotating. Air pressure also flows to return chamber 53.

The operator then depresses and releases feed valve 87, which causes air pressure to momentarily flow from passage 89 through pilot passage 91 to shuttle valve 93. FIG. 2 shows feed valve 87 in the process of being depressed. This causes shuttle valve 93 to shift to the feed position shown in FIGS. 2, 3 and 5. Referring to FIG. 5, the momentary air pressure from pilot passage 91 acted against spool intermediate piston 131 to compress spring 88. Once shifted, shuttle valve 93 remains in the feed position even when feed valve 87 is released and air pressure in passage 91 drops to atmospheric.

The reason is that the pilot pulse air pressure pushed spool 129 from the position shown in FIG. 6 to the position shown in FIG. 5. The pilot pressure pulse in passage 91 acting against spool intermediate piston 135 was sufficient to overcome spring 97. Prior to receiving pilot air pulse through passage 91, there was no pressure acting on the rearward side of spool intermediate piston 135 because chamber 137 was open to atmosphere through exhaust port 143. Also, there is no pilot pressure at retract switch passage 99. Once spool intermediate piston 135 moved to the open position of FIG. 5, passage 107 was exposed to chamber 137, thereby delivering air pressure against the forward side of spool intermediate piston 135 to maintain spring 88 compressed. Prior to that time, passage 107 was pressurized, but it was blocked from chamber 137 because it was located between the two seals of spool intermediate piston 135. Once, passage 107 is opened to chamber 137, air flows from passage 107 flows through passage 95 to feed cylinder 51 (FIG. 2).

The air pressure in feed chamber 51 acts against intermediate piston 33, which exerts a force to move inner housing 21 in the forward direction. The same air pressure continues to be applied to return chamber 53, however that pressure acts against rearward piston 35, which is of a smaller diameter than intermediate moving seal 33. The force exerted is therefore greater in the advancing direction than in the retracting direction. Also, upon actuation of feed valve 87, a pressure pulse is delivered through passage 111 to pressure switch 109, which causes processor 115 to establish a count as well as start the timer.

Referring to FIG. 3, as inner housing 21 moves forward, intermediate piston 33 pushes hydraulic fluid from rearward restrictor chamber 41 out bypass passage 43 through variable orifice 45 and into forward restrictor chamber 39. The feed rate is determined by the particular setting of variable orifice 45, which limits the speed of the feed stroke. Rearward restrictor chamber 41 decreases in volume during the feed stroke while forward restrictor chamber 39 increases in volume the same amount.

Referring to FIG. 4, when reaching the end of the stroke, striker plate 63 contacts and depresses plungers 57 of retract valve 55. This opens retract valves 55, causing pressurized air in feed chamber 51 to flow out pilot passage 99 to shuttle valve 97. Referring to FIG. 5, when this occurs, the pressure on the rearward side of spool rearward piston 139 momentarily equals the air pressure on the forward side of spool intermediate piston 135. Because spool pistons 139, 135 have the same pressure areas, the forward and rearward forces due to air pressure equal each other. Spring 97 has no counteracting force at this time, therefore pushes spool 131 back to the closed position of FIG. 6. When spool 129 reaches the closed position, air pressure from feed cylinder 51 (FIG. 4) flows through exhaust passage 141, spool chamber 137 and out exhaust port 143. At the same time, the air pressure flowing through emergency valve outlet 107 is blocked by the two seals of spool intermediate piston 135.

Referring back to FIG. 2, with the pressure in feed chamber 51 dumped to atmospheric, the pressure within the return chamber 53 quickly pushes inner housing 21 back to the retracted position of FIG. 2. During the retraction stroke, hydraulic fluid flows through check valve 49 and passage 47 rather than orifice 45, so as to allow the return stroke to be faster than the feed stroke.

When retract valve 55 causes air pressure to be applied to pilot passage 99, the air pressure is a momentary pulse because as soon as spool 129 shifts, air pressure in feed cylinder 51 dumps to atmosphere. This momentary pulse of air pressure also communicates through passage 119 to pressure switch 117. Pressure switch 117 signals to processor 115 that the full depth has been reached. Processor 115 stops the timer and optionally displays the total duration of time that it took to drill the stroke. Also, processor 115 compares the elapsed time to the preset reference time and provides a signal to either indicator 123 or indicator 125. If within the reference time, indicator 123 would indicate a successful completion. If outside of the reference time, indicator 125 would indicate that the drill bit is dull or some other problem is occurring. Also, processor 115 displays the cumulative drilled hole count of that particular drill bit on its display.

If during the feed stroke, the operator stops the feed because of an emergency, momentarily depressing emergency valve 101 will dump the pressure from feed cylinder 51 to atmosphere through passages 95 and 107. Once dumped to atmosphere, spring 97 (FIG. 5) will push spool 129 back to the closed position. Air pressure in return chamber 53 remains, however, because it receives its pressure independently from motor passage 85. Consequently, not only will the forward feed stop, but the air pressure in return chamber 53 causes inner housing 21 to automatically retract. Motor 23 continues to operate through the various cycles and turns off only when the operator turns off motor valve 83.

The invention has significant advantages. The annular pneumatic chamber and the annular restrictor chamber provide feeding and feed rate control without generating unbalanced moment arms. The processor reduces the chances for an operator from drilling with a bit that is too dull by keeping not only a running count of the holes drilled but also determining the elapsed time that each hole requires to drill. The processor thus provides electronic monitoring of the bit condition. Utilizing pressure pulse switches avoids having mechanicals limit switches. The pneumatic circuitry provides independent air pressure to the motor from the feed chamber. This assures that the motor is always turning during retraction.

While the invention has been shown in only one of its forms, it should be apparent to those skilled in the art that it is not so limited but it is susceptible to various changes without departing from the scope of the invention. For example, different valving arrangements could be utilized for the pneumatic controls. Although not preferred, other types of sensors rather than dome switches could be utilized to indicate the beginning and end of each stroke.

The invention claimed is:

1. A method of drilling a hole in a workpiece, comprising:
    mounting a tubular inner housing within a bore of a tubular outer housing;
    mounting a motor assembly in the inner housing;
    providing an annular pneumatic cylinder between the inner housing and the outer housing;
    inserting a drill bit into a chuck of the motor assembly;
    supplying air pressure to the motor assembly to rotate the chuck and to the pneumatic cylinder to move the inner housing between the retracted and extended positions;
    providing forward and rearward sealed annular fluid restrictor chambers between the inner housing and the outer housing containing hydraulic fluid;
    providing a bypass passage between the forward and rearward chambers;
    while moving the inner housing forward, causing hydraulic fluid to flow from the forward chamber through the bypass passage to the rearward chamber to limit the speed of the movement to the extended position; and
    adjusting the flow rate of the hydraulic fluid through the bypass passage to select a desired speed.

2. The method according to claim 1 comprising:
    Determining an elapsed time that it took for the motor assembly to move from the retracted position to the extended position, the extended position occurring at the completion of the hole being drilled;
    Comparing the elapsed time determined to a reference time; and
    providing an indication to the operator if the elapsed time exceeds the reference time but after the indication, allowing the pneumatic cylinder assembly to continue to move the motor assembly toward the extended position and the motor assembly to rotate the drill bit until completion of the hole being drilled.

3. The method according to claim 2, further comprising:
    recording a sequential number of cycles of movement of the motor assembly from the retracted to the extended positions.

4. A method of drilling a hole in a workpiece, comprising:
    mounting a motor assembly to a frame;
    mounting a pneumatic cylinder assembly between the motor assembly and the frame;
    installing at least one dome member within a cavity of a drill, the dome member being resilient and deflectable into engagement with an electrical contact;
    connecting an electronic circuit with the electrical contact;
    inserting a drill bit into a chuck of the motor assembly;
    delivering air pressure to the pneumatic cylinder assembly to cause the motor assembly to rotate and to move the motor assembly from a retracted position to an extended position;
    delivering a pulse of air pressure to the cavity upon initial movement of the motor assembly from the retracted position, causing the dome member to deflect into engagement with the contact; and
    with the electronic circuit, detecting the engagement of the dome member with the contact.

* * * * *